United States Patent
Sasaki

(10) Patent No.: US 9,442,681 B2
(45) Date of Patent: Sep. 13, 2016

(54) IMAGE FORMING APPARATUS, METHOD FOR CONTROLLING THE SAME, AND SYSTEM

(71) Applicant: CANON KABUSHIKI KAISHA, Tokyo (JP)

(72) Inventor: Yuto Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/922,066

(22) Filed: Oct. 23, 2015

(65) Prior Publication Data

US 2016/0117134 A1    Apr. 28, 2016

(30) Foreign Application Priority Data

Oct. 27, 2014  (JP) ................................. 2014-218723

(51) Int. Cl.
    *G06F 3/12* (2006.01)
(52) U.S. Cl.
    CPC ............. *G06F 3/122* (2013.01); *G06F 3/1208* (2013.01); *G06F 3/1273* (2013.01); *G06F 3/1274* (2013.01); *G06F 3/1279* (2013.01); *G06F 3/1286* (2013.01); *G06F 3/1287* (2013.01); *G06F 3/1296* (2013.01)
(58) Field of Classification Search
    None
    See application file for complete search history.

(56) References Cited

U.S. PATENT DOCUMENTS

| | | | | |
|---|---|---|---|---|
| 8,953,183 | B2* | 2/2015 | Mizoguchi | H04N 1/4433 358/1.13 |
| 2009/0080022 | A1* | 3/2009 | Tsutsumi | G06F 3/1204 358/1.15 |
| 2013/0176595 | A1* | 7/2013 | Yamada | G06F 3/1222 358/1.16 |
| 2014/0313539 | A1* | 10/2014 | Kawano | G06F 21/44 358/1.14 |
| 2014/0313548 | A1* | 10/2014 | Nishikawa | G06F 3/1285 358/1.15 |
| 2015/0116754 | A1* | 4/2015 | Mukai | G06F 3/1288 358/1.14 |
| 2015/0116767 | A1* | 4/2015 | Sasaki | H04N 1/00244 358/1.15 |
| 2015/0358499 | A1* | 12/2015 | Sasaki | H04N 1/32122 358/1.15 |

FOREIGN PATENT DOCUMENTS

JP    2011-131382 A    7/2011

* cited by examiner

*Primary Examiner* — Dung Tran
(74) *Attorney, Agent, or Firm* — Canon U.S.A., Inc. IP Division

(57) ABSTRACT

An image forming apparatus instructs job execution, and determines whether processing for performing the job execution is executable in the image forming apparatus. In a case where it is determined that the processing is not executable in the image forming apparatus, the image forming apparatus transmits to a server data for performing the job execution. The image forming apparatus determines whether a job exists in a job list, and transmits to the server a deletion request of the data transmitted to the server, using a result of the determination and a detection result of logout.

13 Claims, 12 Drawing Sheets

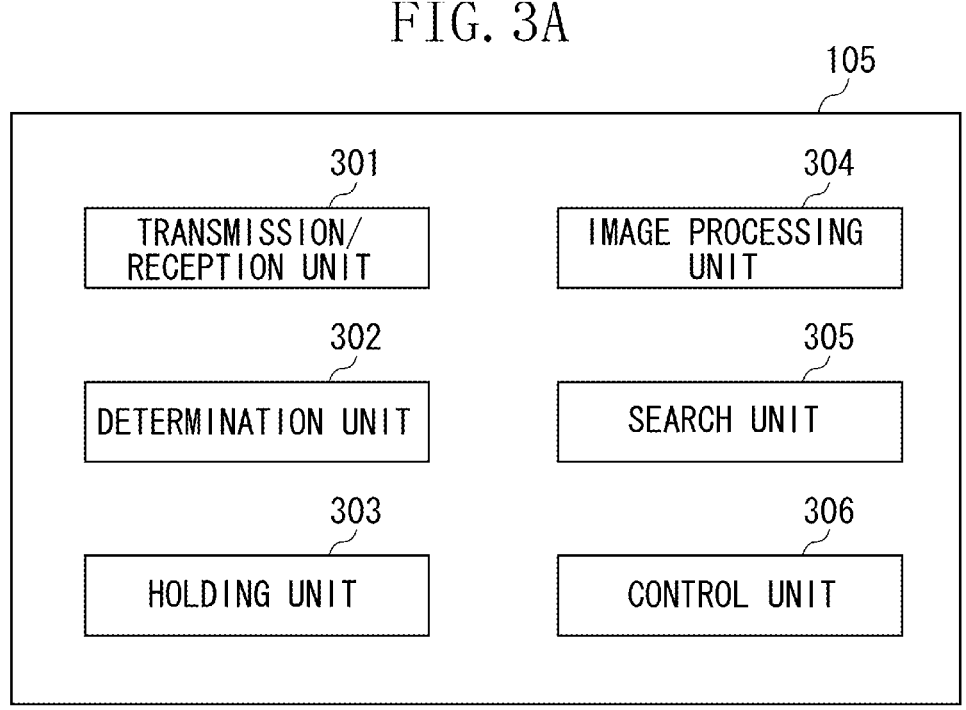
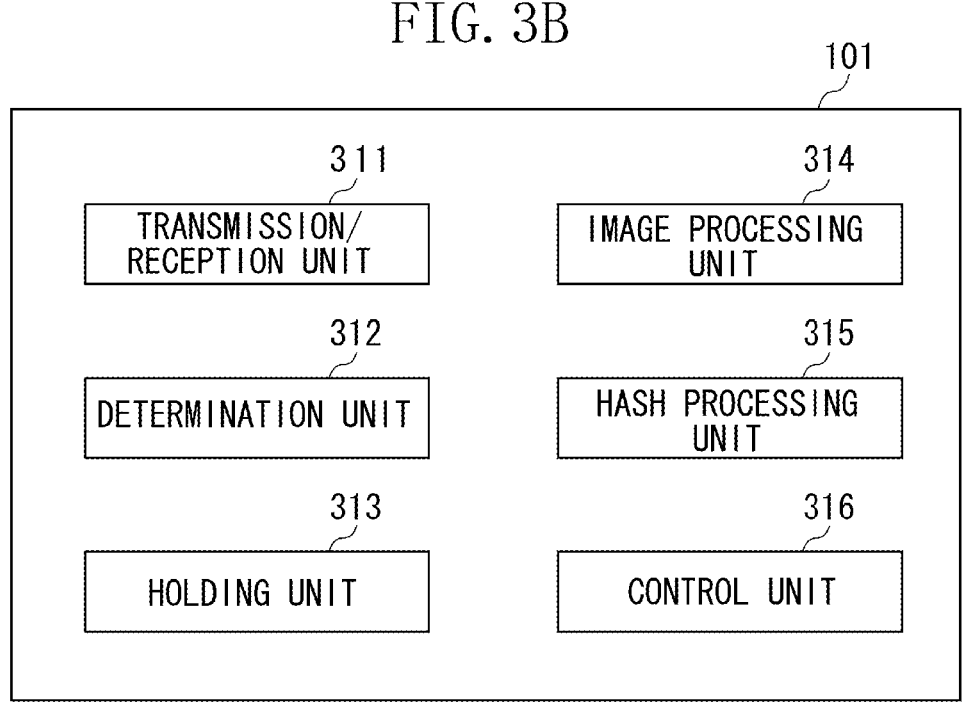

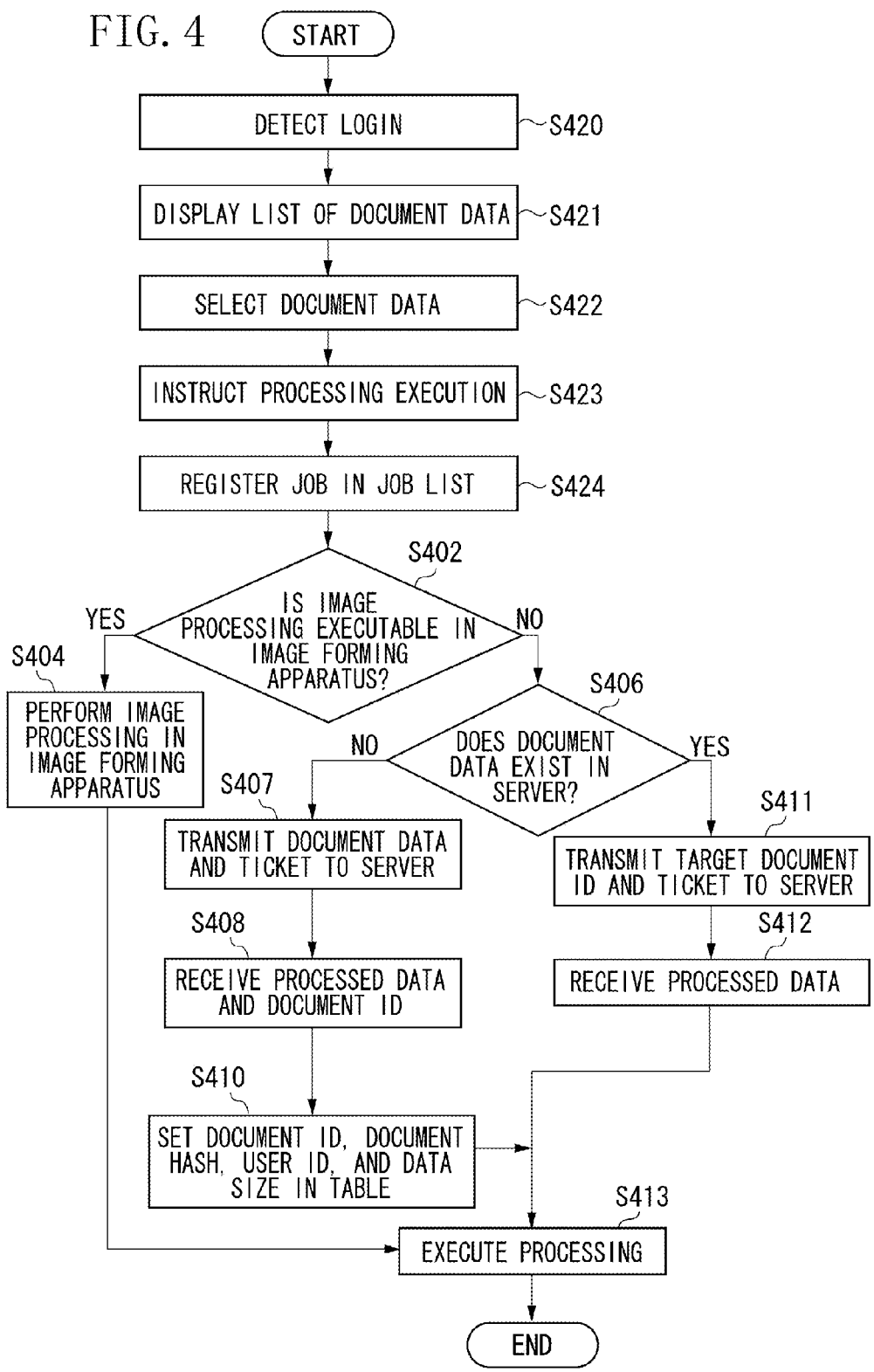

FIG. 6A

USE OF STORED FILE (601)

| | FILE NAME | UPDATE DATE AND TIME | SIZE |
|---|---|---|---|
| PDF | document1.pdf | 01/01/2013 | 35KB |
| MSW | document2.docx | 02/01/2013 | 1.1MB |
| ePUB | document3.epub | 03/01/2013 | 503KB |
| | | | |

602 — (row: document2.docx selected)

603 — PREVIEW    PRINT — 604

LOGOUT — 605

<USE OF STORED FILE>
NOW PROCESSING

FILE NAME: document2.docx

0/10

CANCEL — 607

LOGOUT — 608

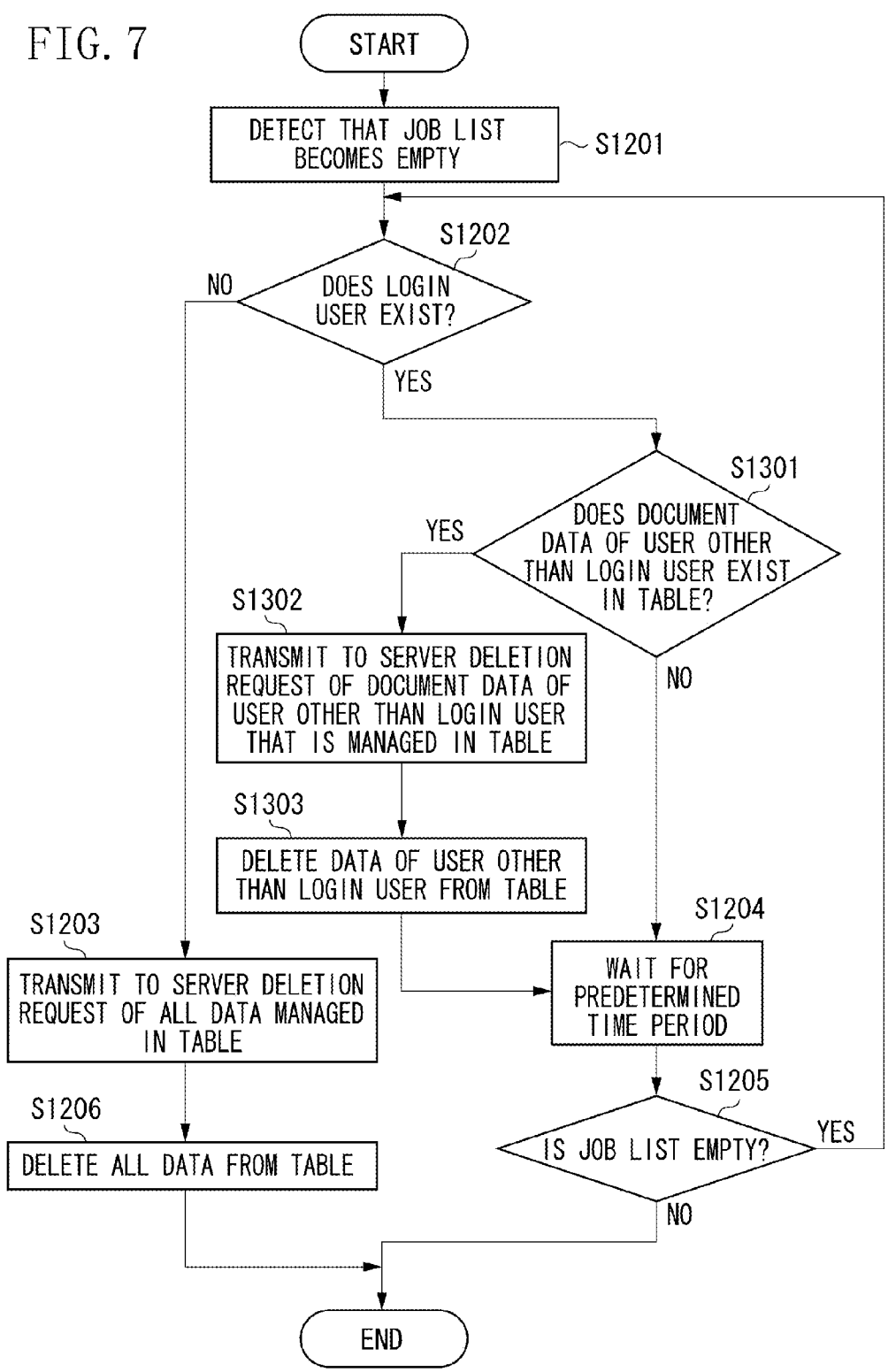

FIG. 8

| DOCUMENT ID | DOCUMENT HASH | USER ID | DATA SIZE |
|---|---|---|---|
| document1 | 1a7fk49anv | user1 | 35KB |
| document2 | fm184mz6f8 | user2 | 1.1MB |
| document3 | 936pqmzj4f | user3 | 503KB |
| document4 | afk037fak3 | user4 | 52KB |

801 802 803 804 805

IMAGE FORMING APPARATUS, METHOD FOR CONTROLLING THE SAME, AND SYSTEM

BACKGROUND

1. Technical Field

The present invention relates to a technique for executing a job in an image forming system including one or more image forming apparatuses and a server.

2. Description of the Related Art

Japanese Patent Application Laid-Open No. 2011-131382 discusses an image forming apparatus which receives designation of document data and performs printing or preview. When conversion cannot be performed within the image forming apparatus, the image forming apparatus enables the printing or the preview by using an external server.

In a system described in Japanese Patent Application Laid-Open No. 2011-131382, there is a use case of reprocessing document data of which processing request has been once issued to a server. If the document data is retransmitted to the server in the use case, performance degrades due to the communication. Therefore, it is considered that the document data is cached in the server for a fixed period, and the cached data is reused. On the other hand, in order to efficiently utilize a resource of the server, a deletion request of the document data cached in the server is supposed to be transmitted to the server from the image forming apparatus at a timing at which a user operating the image forming apparatus logs out from the image forming apparatus.

In this configuration, if the user who has executed a job then logs out in the early stage, the document data cached in the server is deleted before the job is completed using the data cached in the server. Therefore, the cache of the document data existing in the server cannot be efficiently used.

SUMMARY

According to an aspect of the present invention, an image forming apparatus includes an instructing unit configured to instruct job execution, a first determining unit configured to determine whether processing for performing the job execution is executable in the image forming apparatus, a transmitting unit configured to transmit data for performing the job execution to a server, in a case where the first determining unit determines that the processing is not executable in the image forming apparatus, a detecting unit configured to detect logout, a second determining unit configured to determine whether a job exists in a job list, and a deletion request unit configured to transmit to the server a deletion request of the data transmitted to the server, based on a detection result of the logout of the detecting unit and a determination result of the second determining unit.

Further features of the present invention will become apparent from the following description of exemplary embodiments with reference to the attached drawings.

BRIEF DESCRIPTION OF THE DRAWINGS

FIGS. 3A and 3B are functional block diagrams of the server and the image forming apparatus.

FIG. 4 is a flow chart in login and job execution in the image forming apparatus.

FIGS. 6A and 6B illustrate an example of a document data selection screen and an example of a job execution screen.

FIG. 7 is a flow chart illustrating a modified example of a second exemplary embodiment.

FIG. 8 illustrates an example of a table managed in the image forming apparatus.

DESCRIPTION OF THE EMBODIMENTS

Exemplary embodiments of the present invention will be described in detail below with reference to the drawings. The following exemplary embodiments are, however, only examples, and are not to be construed as limiting the scope of the present invention.

Figure 1:
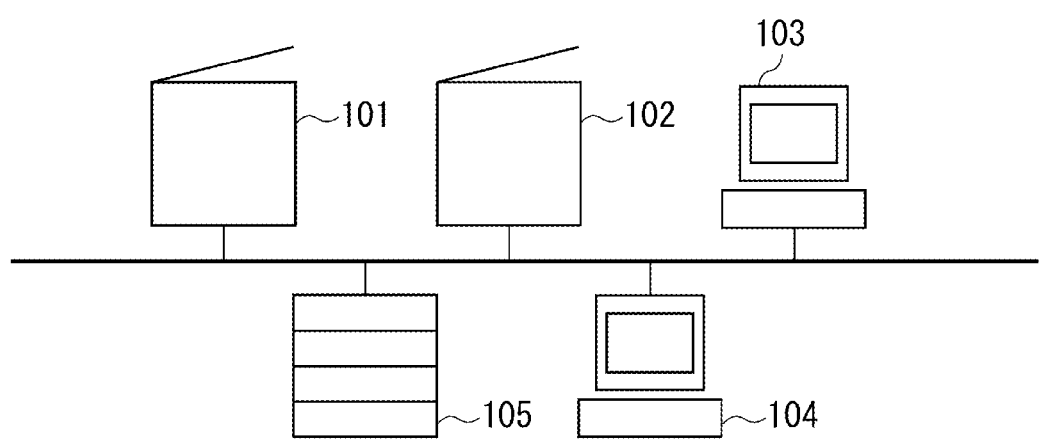
FIG. 1 illustrates a configuration of an image forming system.

FIG. 1 is a configuration diagram illustrating an example of an image forming system according to a first exemplary embodiment. The image forming system includes a plurality of image forming apparatuses including image forming apparatuses 101 and 102, information processing terminals 103 and 104, and a server 105. These apparatuses are connected with each other via a network so as to be able to communicate with each other. The image forming apparatus 101 will be described below as a representative of image forming apparatuses. The above-described network may be based on any communication method as long as the apparatuses within the image forming system can communicate with each other. Examples of the network include a local area network (LAN) and the Internet.

The image forming apparatus 101 can receive an image data print request from an information processing terminal, print an image, read an image using a scanner provided in the apparatus, and print the read image. The image forming apparatus 101 displays to a user a content of a server message block (SMB) shared folder in an information processing terminal and a content of a universal serial bus (USB) memory connected to the image forming apparatus 101. The image forming apparatus 101 can print document data selected by the user from among the contents. In addition, the image forming apparatus 101 can also directly receive the document data from the information processing terminal via a network I/F 224. Examples of a communication protocol include, but are not limited to, a line printer daemon protocol (LPR) and an Internet printing protocol (IPP). The image forming apparatus 101 can further request the server 105 to perform image processing inexecutable by the image forming apparatus 101 itself.

Figure 2A:
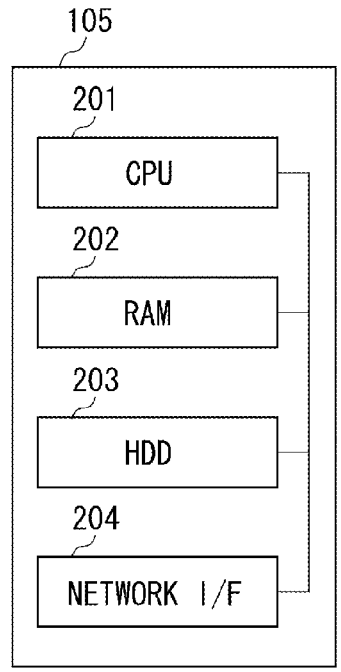
FIGS. 2A and 2B illustrate configurations of a server and an image forming apparatus.

FIG. 2A is a configuration diagram illustrating an example of a configuration of the server 105.

The server 105 includes a central processing unit (CPU) 201, a random access memory (RAM) 202, a hard disk drive (HDD) 203, and a network interface (I/F) 204. The CPU 201 controls the entire apparatus and can control data transmission and reception to/from the RAM 202, the HDD 203, and the network I/F 204. The CPU 201 loads a control program (an instruction) read from the HDD 203, into the RAM 202, and executes the instruction stored in the RAM 202.

The control program (instruction) for implementing image processing that is executable by the CPU 201 is stored in the HDD 203. The image processing herein means the generation of print data and preview data of input document data in various file formats. Another image processing may be performed. In addition, information about file formats processable by the server 105, and a received conversion processing content and document data can be appropriately stored in the HDD 203.

The instruction and data stored in the HDD 203 are loaded into the RAM 202 so that the CPU 201 can read the instruction and the data from the RAM 202. Various types of data required to execute the instruction can be stored in the RAM 202.

The network I/F 204 is an I/F for performing network communication with apparatuses within the image forming system. The network I/F 204 can notify the CPU 201 of data reception, and transmit data in the RAM 202 to the network.

Figure 2B:
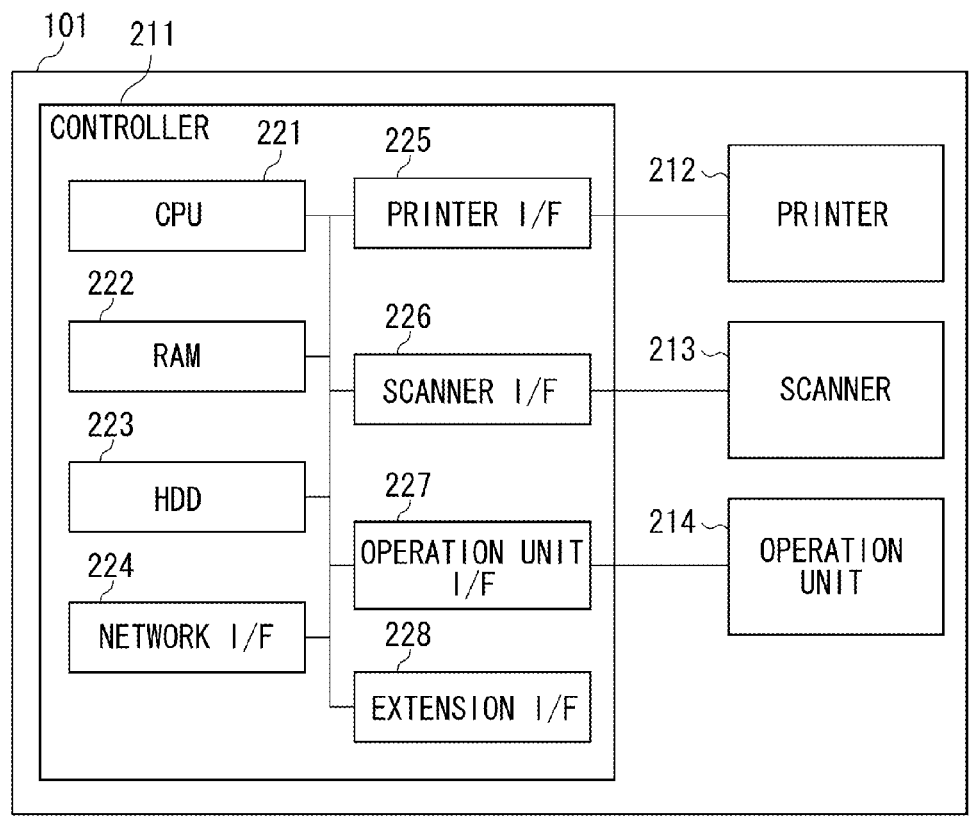

FIG. 2B is a configuration diagram illustrating an example of a configuration of the image forming apparatus 101.

The image forming apparatus 101 includes a controller 211, a printer 212, a scanner 213, and an operation unit 214. The controller 211 includes a CPU 221, a RAM 222, a HDD 223, the network I/F 224, a printer I/F 225, a scanner I/F 226, an operation unit I/F 227, and an extension I/F 228. The CPU 221 can transmit/receive data to/from the RAM 222, the HDD 223, the network I/F 224, the printer I/F 225, the scanner I/F 226, and the operation unit I/F 227. The CPU 221 loads an instruction read from the HDD 223, into the RAM 222, and executes the instruction stored in the RAM 222.

The HDD 223 can store an instruction executable by the CPU 221, setting values to be used by the apparatus, and data related to processing requested by the user.

The instruction stored in the HDD 223 is loaded into the RAM 222 so that the CPU 221 can read the instruction from the RAM 222. Various types of data required to execute the instruction can be stored in the RAM 222.

The network I/F 224 is an I/F for performing network communication with apparatuses within the image forming system. The network I/F 224 can notify the CPU 221 of data reception, and transmit data in the RAM 222 to the network.

The printer I/F 225 can transmit to the printer 212 print data transmitted from the CPU 221, and transmit to the CPU 221 a printer status received from the printer 212. The scanner I/F 226 is an I/F that can transmit to the scanner 213 an image reading instruction received from the CPU 221, transmit to the CPU 221 image data received from the scanner 213, and transmit to the CPU 221 a scanner status received from the scanner 213. The operation unit I/F 227 can transmit to the CPU 221 a user instruction input from the operation unit 214, and transmit to the operation unit 214 screen information for a user operation.

The printer 212 can print image data received from the printer I/F 225 on paper, and transmit a printer status to the printer I/F 225. The scanner 213 can read a document sheet placed on the scanner 213 according to an image reading instruction received from the scanner I/F 226, transmit digitized image data to the scanner I/F 226, and transmit a scanner status to the scanner I/F 226. The operation unit 214 allows the user to operate the image forming apparatus 101. The operation unit 214 includes a liquid crystal display (LCD) having a touch panel, for example, to provide the user with an operation screen and receive an operation from the user.

The extension I/F 228 is an I/F for enabling an external apparatus to be connected to the image forming apparatus 101. For example, the extension I/F 228 is provided with a USB-format interface, and can write/read data into/from a connected external apparatus, such as a USB memory.

FIG. 3A is a functional block diagram of the server 105. A transmission/reception unit 301 transmits/receives data to/from an external apparatus such as the image forming apparatus 101. A determination unit 302 makes various determinations such as determination as to whether the received data is a document ID or document data. A holding unit 303 holds the document data and the document ID. An image processing unit 304 performs image processing on document data. A search unit 305 searches the corresponding document data using the document ID. A control unit 306 performs control such as deletion of document data of which a deletion request is received, from the holding unit 303.

FIG. 3B is a functional block diagram of the image forming apparatus 101. A transmission/reception unit 311 transmits/receives data to/from an external apparatus such as the server 105. A determination unit 312 makes various determinations such as determination as to whether image processing is executable in the image forming apparatus 101. A holding unit 313 holds document data and a table to be described below. An image processing unit 314 performs image processing on document data. A hash processing unit 315 performs hash processing on document data. A control unit 316 performs printing or preview of data processed by the image processing unit 314.

FIG. 4 is a flow chart in login and processing execution in the image forming apparatus 101.

Figure 5:
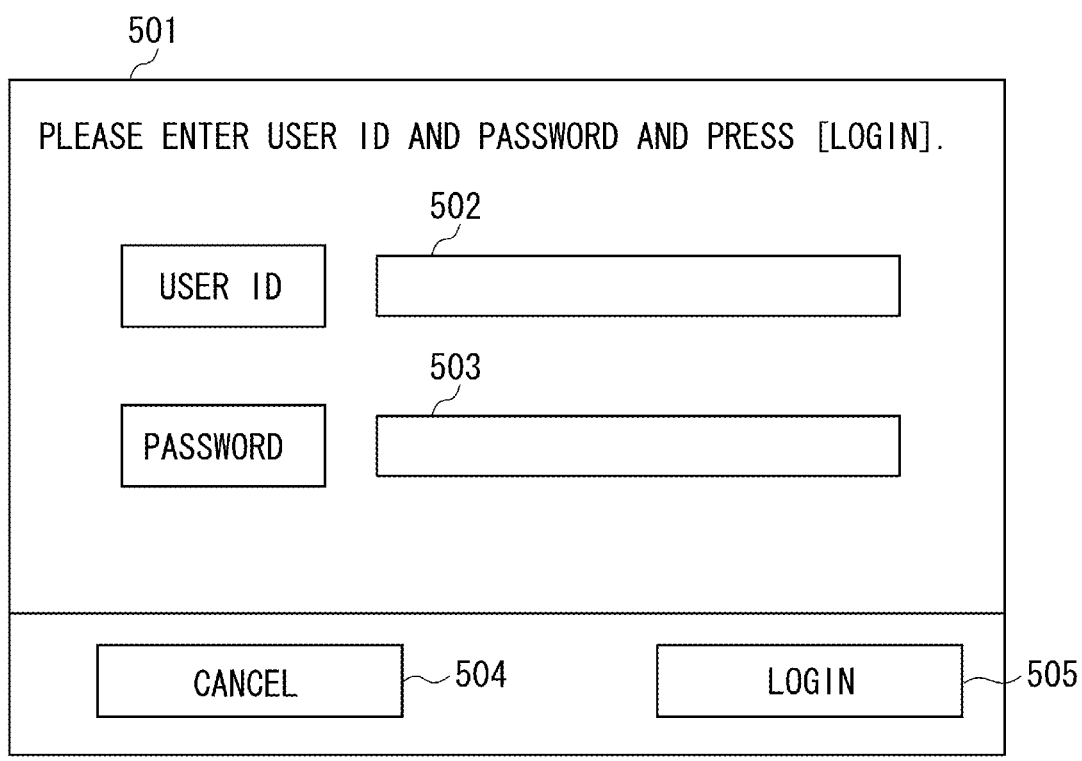
FIG. 5 illustrates an example of a login screen.

In step S420, a login screen 501 is displayed, and the determination unit 312 performs login detection. FIG. 5 illustrates an example of the login screen 501 displayed on the operation unit 214. After a user ID 502 and a password 503 are entered by the user using the present system, when the CPU 221 detects a login button 505 being pressed, the user shifts to a login state. If the CPU 221 detects a cancel button 504 being pressed, the CPU 221 cancels login.

In step S421, the operation unit 214 displays a list of stored document data, on a display screen. Specifically, the operation unit 214 displays a list of document data stored in the HDD 223 of the image forming apparatus 101, the USB memory connected to the image forming apparatus 101, and the SMB shared folder in the information processing terminal. FIG. 6A illustrates an example of a document data selection screen 601 displayed on the operation unit 214. The document data selection screen 601 is a screen for selecting document data held in the holding unit 313.

In step S422, the control unit 316 selects the document data from the displayed list of document data. For example, when the press of document data 602 is detected in the example of FIG. 6A, "document2.docx" corresponding to the document data 602 is selected. A plurality of document data may be selected from the list of the document data.

In step S423, the control unit 316 instructs processing execution of the selected document data. In the example of FIG. 6A, the execution instruction includes a preview instruction of document data and a printing instruction of document data. When the CPU 221 detects a preview button 603 being pressed, the CPU 221 writes a preview processing content and a user ID of a login user in header information of the document data. When the CPU 221 detects a print button 604 being pressed, the CPU 221 writes a print content and the user ID of the login user in the header information of the document data. A timing at which the user ID of the login user is written in the header information of the document data may be after the selection in step S422. The user ID is the user ID 502 received on the login screen 501. The user ID may be not only an ID unique to a user but also an organization ID managed as an organization, or an administrator ID for login of an administrator. Furthermore, examples of printing and preview are described as processing of which execution is instructed in step S423, but another processing may be performed. For example, FAX and data transmission may be performed.

In step S424, the control unit 316 registers, in a job list, a job of which execution is instructed in step S423. Specifically, the control unit 316 registers, in the job list, the job of the document data of which execution is instructed. After starting the job execution, the control unit 316 deletes the ended job from the job list at a time point at which the job execution is ended. That is, the job list is a list of jobs under execution or jobs waiting for execution.

In step S402, the determination unit 312 determines whether the received document data is processable in the image forming apparatus 101. Specifically, the determination unit 312 determines whether a processing content for the document data that is included in the header information is processable in the image forming apparatus 101. The processing herein refers to, for example, image data generation for preview, image data generation for thumbnail, print data generation, and format conversion of document data. The processing refers to processing required for executing the job in step S413.

When the processing is processable in the controller 211 of the image forming apparatus 101 (YES in step 402), in step S404, the image processing unit 314 performs image processing. In step S413, the control unit 316 executes the processing instructed in step S423. In the example of the present exemplary embodiment, the processing is printing or preview.

When the processing is not processable in the controller 211 of the image forming apparatus 101 (No in step 402), in step S406, the determination unit 312 determines whether the document data exists in the server 105. The determination unit 312 spools the received document data once, calculates a document hash, and compares the document data with a table 801, to make the determination.

FIG. 8 illustrates an example of a table managed in the image forming apparatus 101 according to the present exemplary embodiment. The table 801 is a table (transmission list) illustrating document data transmitted to the server 105. Since the server 105 has a function of holding the document data transmitted from the image forming apparatus 101, it is possible to check, by using the table 801, whether the document data received by the image forming apparatus 101 is held in the server 105. The table 801 includes a document ID 802, a document hash 803, a user ID 804, and a data size 805. The document ID 802 is an ID for identifying document data held in the server 105. The document ID 802 is only required to be an ID for identifying document data. For example, the document ID 802 may be a unique ID for accessing document data, such as a uniform resource locator (URL). The document hash 803 is a hash value of document data. The user ID 804 is an ID of a user who has transmitted document data to the server 105. The data size 805 is a data size of document data. The CPU 221 of the image forming apparatus 101 calculates, by the hash processing unit 315, a hash of the selected document data, to generate a document hash. The CPU 221 then acquires the data size of the selected document data and the user ID of a user of which login is detected. The determination unit 312 checks whether document data having attributes all matching those of the received document data exists in the table 801. When such document data exists in the table 801, the determination unit 312 determines in step S406 that the document data exists in the server 105. When such document data does not exist in the table 801, the determination unit 312 determines in step S406 that the document data does not exist in the server 105. Herein, the determination unit 312 determines whether the document data exists in the server 105, using the hash of the document data, the data size of the document data, and the user ID. The determination unit 312 may determine whether the document data exists in the server 105, using another method.

When the determination unit 312 determines in step S406 that the document data does not exist in the server 105 (No in step S406), in step S407, the transmission/reception unit 311 transmits the document data and a generated ticket to the server 105. The ticket is data for describing settings for the server 105 executing processing. For example, the ticket is described in a format interpretable by the server 105, such as JavaScript (registered trademark) Object Notation (Json) and Extensible Markup Language (XML). Attribute values necessary for the server 105 performing image processing, such as a format of input document data and an image processing content, are set in the ticket. The form and content of the ticket are not limited to the above.

In step S408, the image forming apparatus 101 receives, by the transmission/reception unit 311, processed data and a document ID for accessing unprocessed data in the server 105. In step S410, the image forming apparatus 101 sets the received document ID 802, the generated document hash 803, the user ID 804, and the data size 805 in the table 801. In step S413, the image forming apparatus 101 executes a job. In step S413, the image forming apparatus 101 executes the processing instructed in step S423. In the example of the present exemplary embodiment, the processing is printing or preview.

When the determination unit 312 determines in step S406 that the document data exists in the server 105 (YES in step S406), in step S411, the search unit 305 searches the table 801 for the target document ID 802, and the transmission/reception unit 311 transmits the document ID 802 and the ticket to the server 105. Also in the present flow, the processing of the server 105 will be described below. When the image forming apparatus 101 receives the processed data in step S412, in step S413, the image forming apparatus 101 executes the processing instructed in step S423, using the processed data.

When the control unit 316 selects a plurality of documents in step S422, the control unit 316 registers, in step S424, respective jobs of the documents in the job list, and performs the processing in step S402 and subsequent steps for each job.

Figure 9:
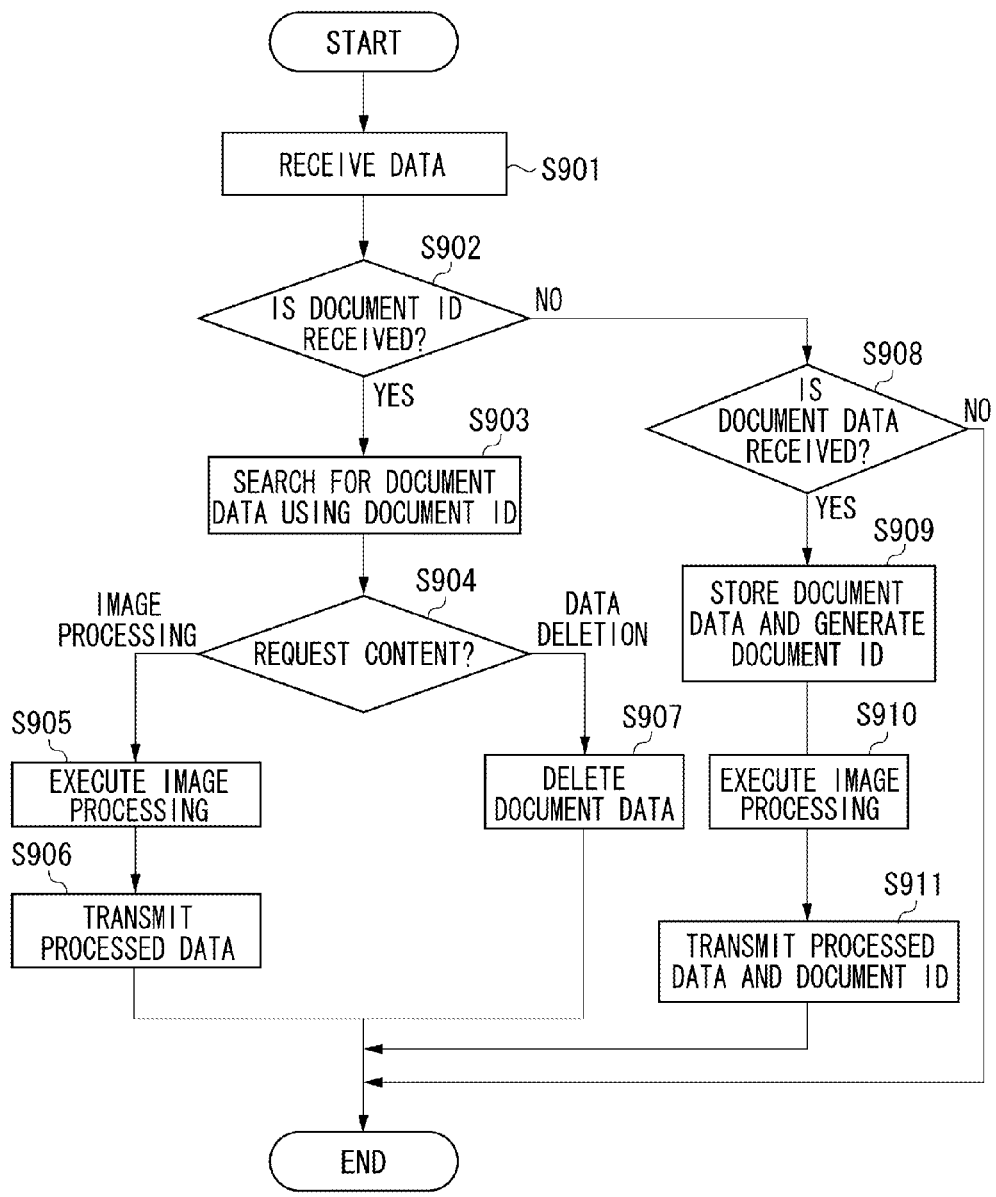
FIG. 9 is a flow chart in the server.

FIG. 9 is a flow chart in the server 105. The processing of the server 105 connected to the image forming apparatus 101 will be described with reference to the flow chart. In step S901, the transmission/reception unit 301 receives data from the image forming apparatus 101. Subsequently, in step S902, the determination unit 302 determines whether the document ID is included in the received data, i.e., whether the document ID is received. When the determination unit 302 determines that the transmission/reception unit 301 receives the document ID (YES in step S902), the processing proceeds to step S903. When the determination unit 302 determines that the transmission/reception unit 301 does not receive the document ID (NO in step S902), the processing proceeds to step S908. When the determination unit 302 determines that the transmission/reception unit 301 receives the document ID (YES in step S902), in step S903, the search unit 305 searches for the document data using the document ID. Subsequently, in step S904, the determination unit 302 determines a request content. When the request content is image processing ("IMAGE PROCESSING" in step S904), in step S905, the image processing unit 304 executes image processing on the identified document data. Specifically, in step S905, the image processing unit 304 analyzes the content of the received ticket, and executes image processing on the document data. In step S906, the transmission/reception unit 301 transmits the processed data to the image forming apparatus 101. On the other hand, when the request content is data deletion in step S904 ("DATA DELETION" in step S904), in step S907, the control unit 306 deletes, from the holding unit 303 (HDD 203), the document data having the document ID matching the received document ID.

When the determination unit 302 determines in step S908 that the transmission/reception unit 301 receives the document data (YES in step S908), the processing proceeds to step S909. When the determination unit 302 determines that the transmission/reception unit 301 does not receive the document data (NO in step S908), the processing is ended. When the determination unit 302 determines in step S908 that the transmission/reception unit 301 receives the document data, in step S909, the control unit 306 stores the document data in the holding unit 303 (HDD 203) and generates the document ID 802. In step S910, the image processing unit 304 analyzes the content of the received ticket, and executes image processing on the document data. Subsequently, in step S911, the transmission/reception unit 301 transmits the processed data and the document ID 802 to the image forming apparatus 101.

Subsequently, an example of a screen displayed after the user starts the processing execution will be described. FIG. 6B illustrates an example of a screen displayed during job execution. Specifically, the CPU 221 detects the print button 604 being pressed on the document data selection screen 601 of FIG. 6A, and then displays a job execution screen 606 on the operation unit 214 after the processing start of the job registered in the job list. When the CPU 221 detects a cancel button 607 being pressed, the CPU 221 cancels the processing of the job of which the processing has been started. The user can press a logout button 608 also at this stage. When the CPU 221 detects a logout button 605 being pressed, the CPU 221 shifts the user to a logout state. The document data selection screen 601 of FIG. 6A illustrates the document data selection screen displayed when the user is in the login state. The user can also log out by pressing the logout button 605 on the screen.

Figure 10:
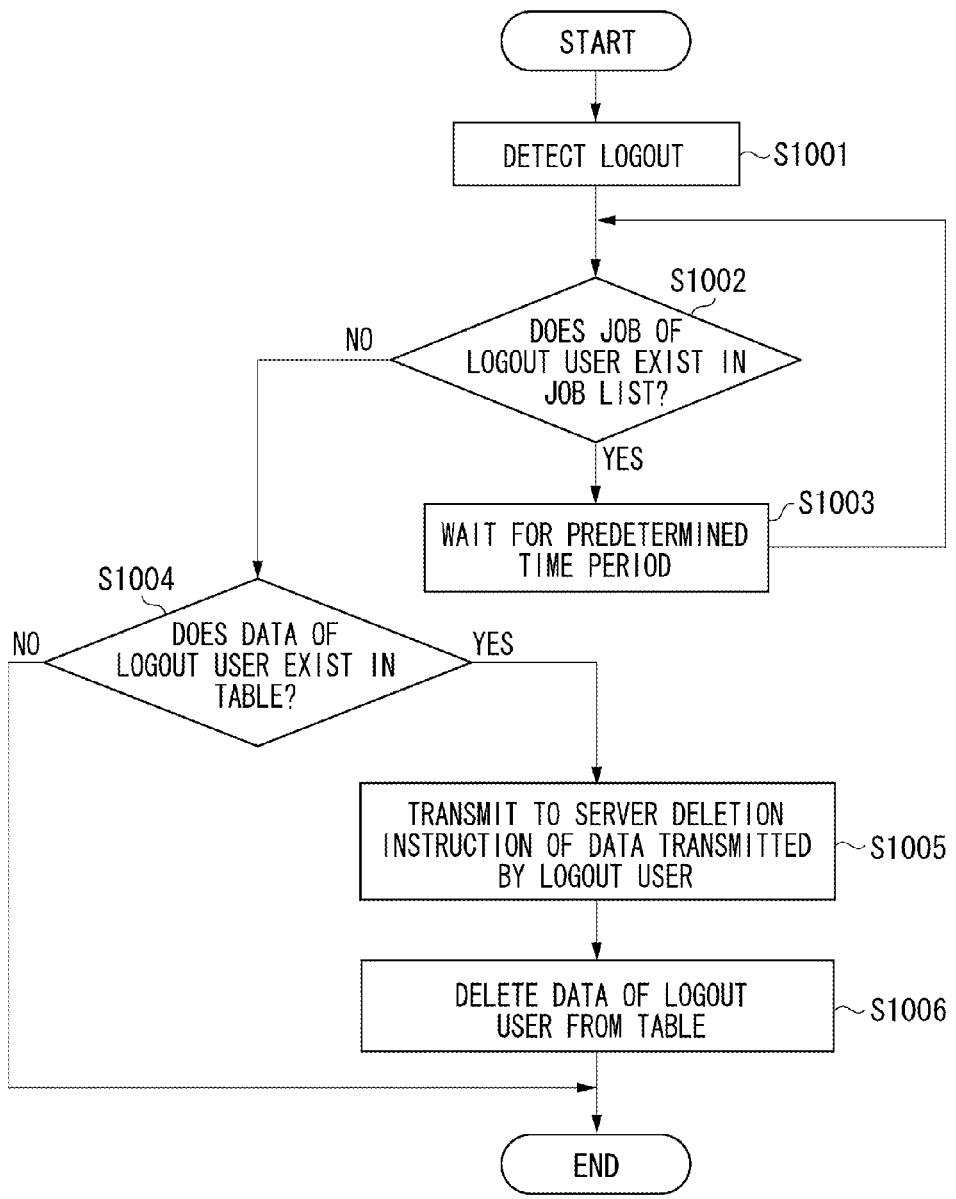
FIG. 10 is a flow chart in logout according to a first exemplary embodiment.

FIG. 10 is a flow chart in logout according to the present exemplary embodiment. The processing of the image forming apparatus 101 in logout will be described with reference to the present flow chart.

In step S1001, the determination unit 312 detects the logout button 605 being pressed. The logout button 605 is always displayed on the operation unit 214 of the image forming apparatus 101 when the user is in the login state. The login user can log out at any timing by pressing the logout button 605. The logout detection (S1001) includes not only the detection of the logout button 605 being pressed but also the detection of logout automatically executed according to an automatic logout setting preset in the HDD 203. The logout may be performed by another method. In step S1002, the determination unit 312 determines whether the job of the logout user exists in the job list managed in the holding unit 313 of the image forming apparatus 101. Specifically, the determination unit 312 compares the user ID of the logout user with the user ID 502 set in the header information of each job in the job list, to determine whether the job including the user ID matching the user ID of the logout user exists. When the determination unit 312 determines in step S1002 that the job of the logout user exists the job list (YES in step S1002), in step S1003, the determination unit 312 waits for a predetermined time period, and in step S1002, the determination unit 312 redetermines whether the job of the logout user exists in the job list. The processing for waiting for a predetermined time period may be substituted with the reception of an event at a timing at which the job list becomes empty. When the determination unit 312 determines in step S1002 that no job exists in the job list, i.e., that no job under execution or waiting for execution exists, in step S1004, the determination unit 312 determines whether the data of the logout user exists in the table 801. Specifically, the determination unit 312 compares the user ID of the logout user with the user ID 804 managed in the table 801 to determine whether the data including the user ID matching the user ID of the logout user exists. When the determination unit 312 determines in step S1004 that the data of the logout user does not exist (NO in step S1004), the processing is ended. On the other hand, when the determination unit 312 determines in step S1004 that the data of the logout user exists (YES in step S1004), in step S1005, the transmission/reception unit 311 transmits to the server 105 the deletion instruction of the data transmitted by the logout user. Specifically, the control unit 316 acquires, from the table 801, the document ID corresponding to the data including the user ID matching the user ID of the logout user, and transmits the deletion instruction of the document ID to the server 105. When a plurality of data including the user ID matching the user ID of the logout user exists in the table 801, the transmission of the deletion request includes transmitting the deletion request of all the data including the user ID matching the user ID of the logout user. In step S1006, the control unit 316 deletes the data of the logout user from the table 801.

In the present exemplary embodiment, the description has been given of the example in which the processing is switched in step S1002 according to whether the job of the logout user exists in the job list. However, besides this, the processing may be switched according to whether any job exists in the job list.

According to the present exemplary embodiment, the deletion request of the document data is not transmitted to the server 105 even if the press of the logout button 605 is detected from the job execution screen 606 during job execution or in a job waiting state. That is, the configuration according to the present exemplary embodiment prevents a situation in which the deletion request of the document data is transmitted to the server 105 during job execution, and the same document data is retransmitted to the server 105. Therefore, a transmission load on the server can be reduced, and the document data in the server can be efficiently used.

In the above exemplary embodiment, the description has been given of the example in which the server performs the image processing, which is part of the processing required for the job execution. The server may perform all the processing required for the job execution. Alternatively, the server may perform only the processing which is not processable in the image forming apparatus.

In the first exemplary embodiment, the description has been given of the example in which the deletion request of the document data is transmitted to the server 105 at a stage where the target job becomes nonexistent in the job list after the detection of the logout. In a modified example of the first exemplary embodiment, the description will be given of an example in which processing is switched according to a login user ID further acquired at a stage where a target job becomes nonexistent in a job list after the detection of logout.

Figure 11:
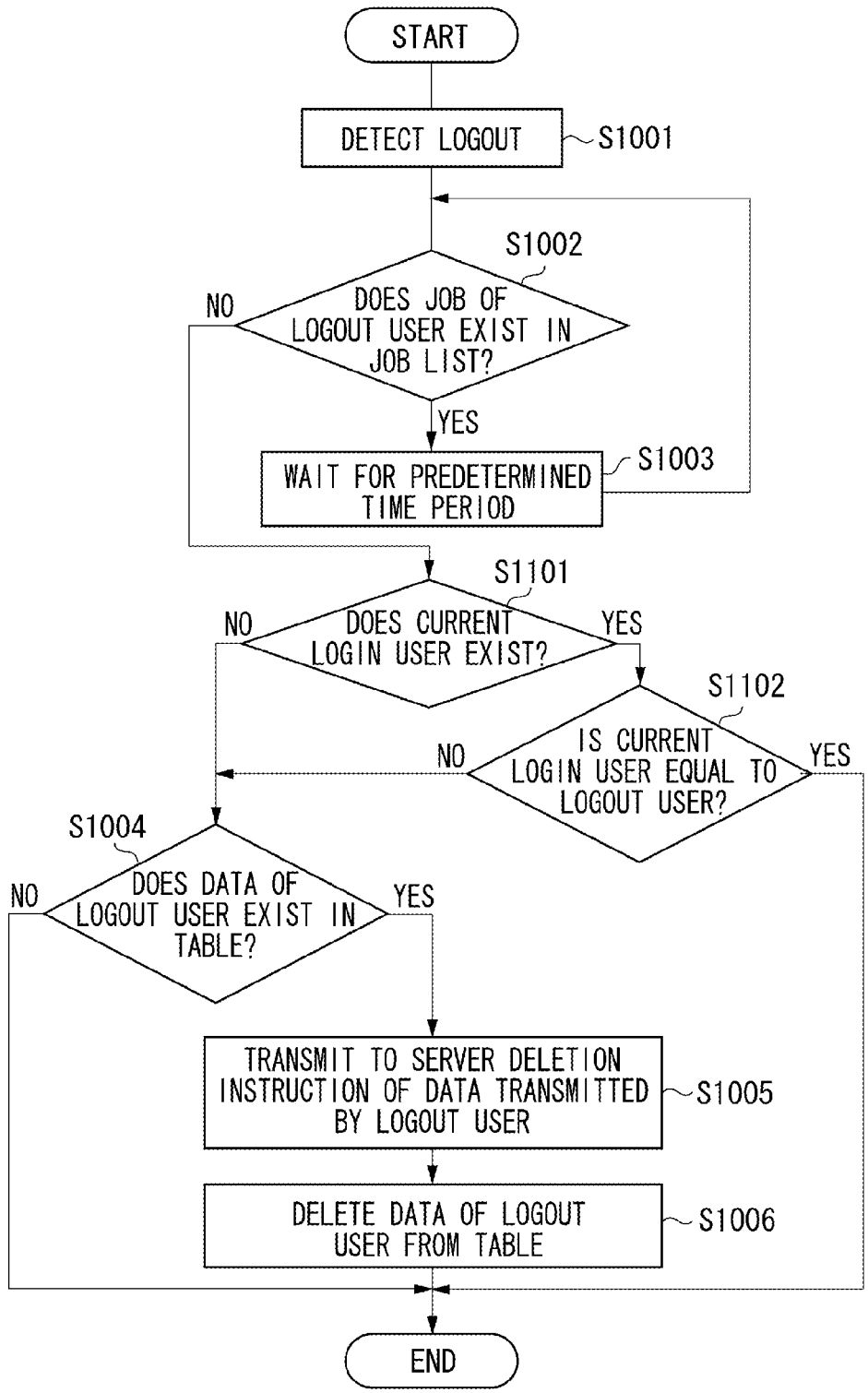
FIG. 11 is a flow chart illustrating a modified example of the first exemplary embodiment.

FIG. 11 is a flow chart illustrating a modified example of the present exemplary embodiment. Since the flow chart is similar to that of FIG. 10 except steps S1101 and S1102, the detailed description thereof is omitted. When the determination unit 312 determines in step S1002 that a job of a logout user does not exist in a job list (NO in step S1002), in step S1101, the determination unit 312 subsequently determines whether a user being in a logged-in state at that point in time (current login user) exists. When the determination unit 312 determines in step S1101 that the login user does not exist (NO in step S1101), the processing proceeds to step S1004. When the determination unit 312 determines in step S1101 that the login user exists (YES in step S1101), in the step S1102, the determination unit 312 subsequently determines whether the current login user is equal to the user who has logged out in step S1001. When the determination unit 312 determines in step S1102 that the login user is not equal to the logout user (NO in step S1102), the processing proceeds to step S1004. When the determination unit 312 determines that the login user is equal to the logout user (YES in step S1102), the processing is ended.

According to the modified example of the present exemplary embodiment, the cache can be used even if the user logs in again while the determination unit 312 waits until the job of the user becomes nonexistent in the job list after the logout of the user. Therefore, document data in a server can be used more efficiently.

In the first exemplary embodiment, the description has been given of the example in which the timing at which the deletion request of the document data is transmitted to the server 105 is switched according to the state of the job list acquired after the detection of the logout. In a second exemplary embodiment, the description will be given of an example in which a timing at which a deletion request of document data is transmitted to the server 105 is switched according to a login user ID acquired after it is detected that a job list becomes empty. Since the configuration of the second exemplary embodiment is similar to that described in the first exemplary embodiment, the detailed description thereof is omitted.

Figure 12:
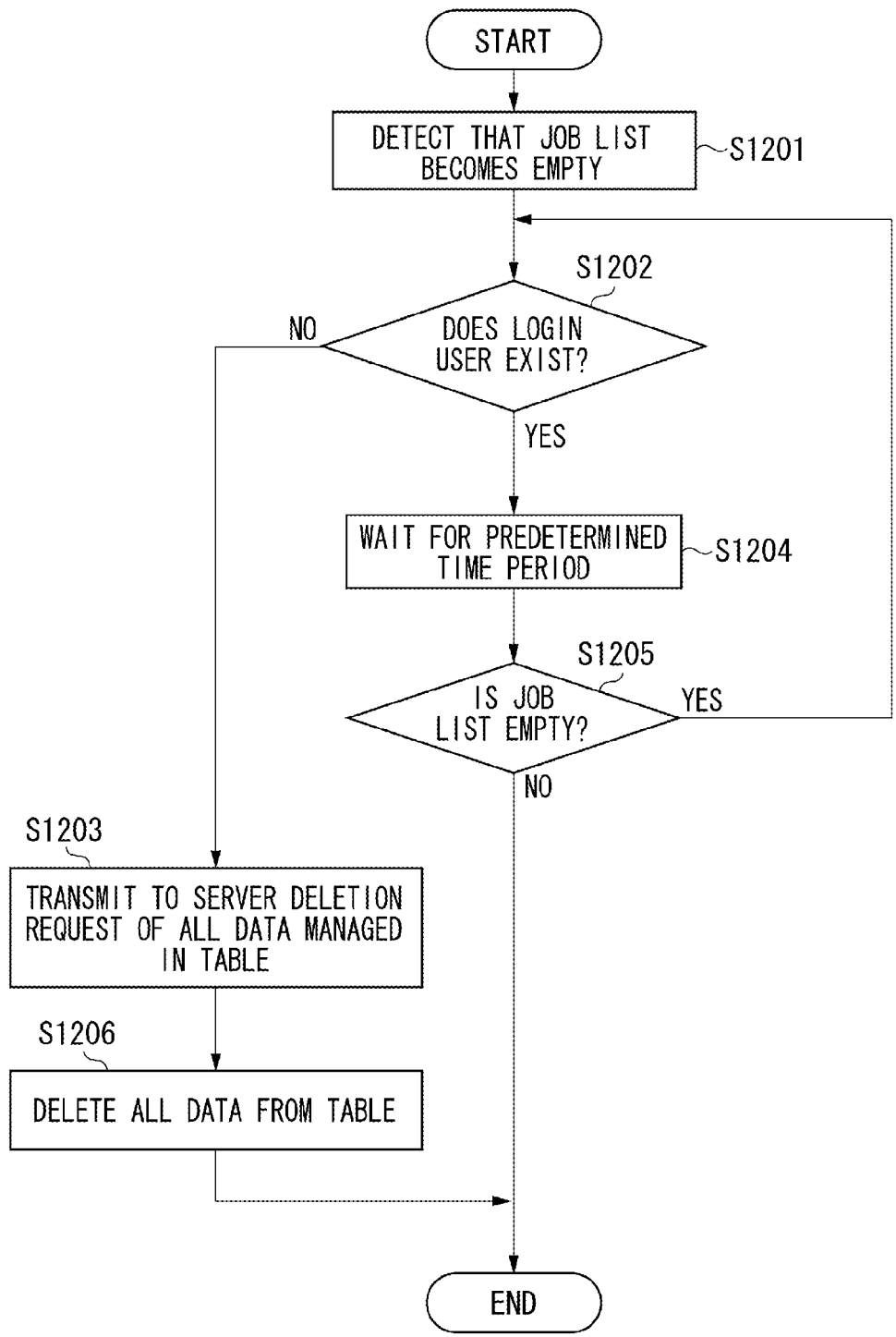
FIG. 12 is a flow chart of processing performed when a job list is empty according to the second exemplary embodiment.

FIG. 12 is a flow chart of processing performed when the job list becomes empty according to the present exemplary embodiment. When the determination unit 312 detects in step S1201 that the job list becomes empty, in step S1202, the determination unit 312 determines whether a login user exists. When the determination unit 312 determines in step S1202 that the login user does not exist (NO in step S1202), in step S1203, the transmission/reception unit 311 transmits to the server 105 a deletion request of all data managed in the table 801. In step S1206, the control unit 316 deletes all the data from the table 801. When the determination unit 312 determines in step S1202 that the login user exists (YES in step S1202), in step S1204, the determination unit 312 waits for a predetermined time period, and in step S1205, the determination unit 312 then determines whether the job list is empty. When the job list is not empty (NO in step S1205), the processing is ended. On the other hand, when the job list is empty (YES in step S1205), the processing returns to step S1202, in which the determination unit 312 redetermines whether the login user exists.

According to the present exemplary embodiment, deletion processing can be triggered by the job list becoming empty. Thus, even the image forming apparatus which cannot detect the timing of the logout unlike the one described in the first exemplary embodiment, for example, can execute the processing of this function.

In the second exemplary embodiment, the description has been given of the example in which the deletion request of all the document data existing in the table 801 is transmitted to the server 105 when the job list becomes empty and the login user no longer exists. In a modified example of the second exemplary embodiment, the description will be given of an example in which, when a login user exists, processing is switched further according to a user ID of the login user.

FIG. 7 is a flow chart illustrating the modified example of the present exemplary embodiment. Since the flow chart is similar to that of the example illustrated in FIG. 12 except steps S1301, S1302, and S1303, the detailed description thereof is omitted. When the determination unit 312 determines in step S1202 that the login user exists (YES in step S1202), in step S1301, the CPU 221 subsequently checks whether document data of a user other than the login user exists in the table 801. When the CPU 221 determines in step S1301 that the document data of a user other than the login user does not exist (NO in step S1301), in step S1204, the CPU 221 waits for a predetermined time period. On the other hand, when the CPU 221 determines in step S1301 that the document data of a user other than the login user exists (YES in step S1301), in step S1302, the transmission/reception unit 311 transmits to the server 105 a deletion request of the document data of the user other than the login user that is managed in the table 801. In step S1303, the control unit 316 deletes the data of the user other than the login user from the table 801.

According to the modified example of the present exemplary embodiment, document data of a user other than a logout user can be deleted even if the login user exists after a job list becomes empty. Therefore, the resource of the server can be used more effectively.

The flow charts of FIGS. 4, 7, 10, 11, and 12 may be achieved by the CPU 221 of the image forming apparatus 101 according to the program stored in the HDD 223. The flow chart of FIG. 9 may be achieved by the CPU 201 of the server 105 according to the program stored in the HDD 203.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments as described above, a deletion request of data transmitted to a server is transmitted to the server based on a detection result of logout and a result of determination such as determination as to whether any job exists in a job list. As a result, the transmission load on the server can be reduced, and the document data in the server can be used efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-218723, filed Oct. 27, 2014, which is hereby incorporated by reference herein in its entirety.

What is claimed is:

1. An image forming apparatus comprising:
   an instructing unit configured to instruct job execution;
   a first determining unit configured to determine whether processing for performing the job execution is executable in the image forming apparatus;
   a transmitting unit configured to transmit to a server data for performing the job execution, in a case where the first determining unit determines that the processing is not executable in the image forming apparatus;
   a detecting unit configured to detect logout;
   a second determining unit configured to determine whether a job exists in a job list; and
   a deletion request unit configured to transmit to the server a deletion request of the data transmitted to the server, based on a detection result of the logout of the detecting unit and a determination result of the second determining unit.

2. The image forming apparatus according to claim 1, wherein the deletion request unit transmits to the server the deletion request of the data transmitted to the server, in a case where the detecting unit detects the logout and the second determining unit determines that no job exists in the job list.

3. The image forming apparatus according to claim 1, further comprising a holding unit configured to hold a transmission list indicating data transmitted to the server by the transmitting unit.

4. The image forming apparatus according to claim 3, further comprising a third determining unit configured to determine whether data transmitted to the server by a user whose logout is detected by the detecting unit exists in the transmission list, wherein the data is transmitted when the user is in a logged-in state,
   wherein the deletion request unit transmits to the server a deletion request of the data transmitted to the server by the user in the logged-in state, in a case where the detecting unit detects the logout, the second determining unit determines that no job exists in the job list, and the third determining unit determines that the data of the user whose logout is detected exists.

5. The image forming apparatus according to claim 1, wherein the detecting unit detects whether a login user exists, and wherein the deletion request unit transmits to the server the deletion request of the data transmitted to the server, in a case where the detecting unit detects that no login user exists, and the second determining unit determines that no job exists in the job list.

6. The image forming apparatus according to claim 1, further comprising:
   a registering unit configured to register the instructed job in the job list; and
   a deleting unit configured to delete an executed job from the job list after the job execution.

7. The image forming apparatus according to claim 1, wherein the job execution instructed by the instructing unit is printing.

8. The image forming apparatus according to claim 1,
   wherein the transmitting unit further transmits a content of processing to be performed on the data, and
   wherein the server includes a receiving unit configured to receive the data processed by the server based on the processing content.

9. A method for controlling an image forming apparatus, the method comprising:
   an instructing step of instructing, by an instructing unit, job execution;
   a first determination step of determining, by a first determining unit, whether processing for performing the job execution is executable in the image forming apparatus;
   a transmitting step of transmitting, by a transmitting unit, to a server data for performing the job execution, in a case where it is determined in the first determination step that the processing is not executable in the image forming apparatus;
   a detecting step of detecting logout by a detecting unit;
   a second determination step of determining, by a second determining unit, whether a job exists in a job list; and
   a deletion request step of transmitting, by a deletion request unit, to the server a deletion request of the data transmitted to the server, based on a detection result of the logout of the detecting step and a determination result of the second determination step.

10. A non-transitory computer readable storage medium storing a program for causing a computer to execute:
    an instructing step of instructing job execution;
    a first determination step of determining whether processing for performing the job execution is executable in the computer;
    a transmitting step of transmitting to a server data for performing the job execution, in a case where it is determined in the first determination step that the processing is not executable in the computer;
    a detecting step of detecting logout;
    a second determination step of determining whether a job exists in a job list; and
    a deletion request step of transmitting to the server a deletion request of the data transmitted to the server, based on a detection result of the logout of the detecting step and a determination result of the second determination step.

11. A system including an image forming apparatus and a server,
    the image forming apparatus comprising:
    an instructing unit configured to instruct job execution;
    a first determining unit configured to determine whether processing for performing the job execution is executable in the image forming apparatus;
    a transmitting unit configured to transmit to a server data for performing the job execution, in a case where the first determining unit determines that the processing is not executable in the image forming apparatus;
a detecting unit configured to detect logout;
a second determining unit configured to determine whether a job exists in a job list; and
a deletion request unit configured to transmit to the server a deletion request of the data transmitted to the server, based on a detection result of the logout of the detecting unit and a determination result of the second determining unit, the server comprising:
a receiving unit configured to receive the data for performing the job execution;
a holding unit configured to hold the data;
a processing unit configured to process the data;
a unit configured to transmit the processed data to the image forming apparatus; and
a deleting unit configured to delete the data from the holding unit based on the deletion request of the data received from the image forming apparatus.

12. The system according to claim 11, wherein the deletion request unit transmits to the server the deletion request of the data transmitted to the server, in a case where the detecting unit detects the logout and the second determining unit determines that no job exists in the job list.

13. The system according to claim 11, wherein the job execution instructed by the instructing unit is printing.

* * * * *